Sept. 23, 1952         H. C. GRANT, JR                2,611,577
                        VALVE ASSEMBLY
Filed Dec. 2, 1947                              3 Sheets-Sheet 1

INVENTOR.
HARRY C. GRANT, JR.
BY
J. William Carson
ATTORNEY

Sept. 23, 1952    H. C. GRANT, JR    2,611,577
VALVE ASSEMBLY
Filed Dec. 2, 1947    3 Sheets-Sheet 2
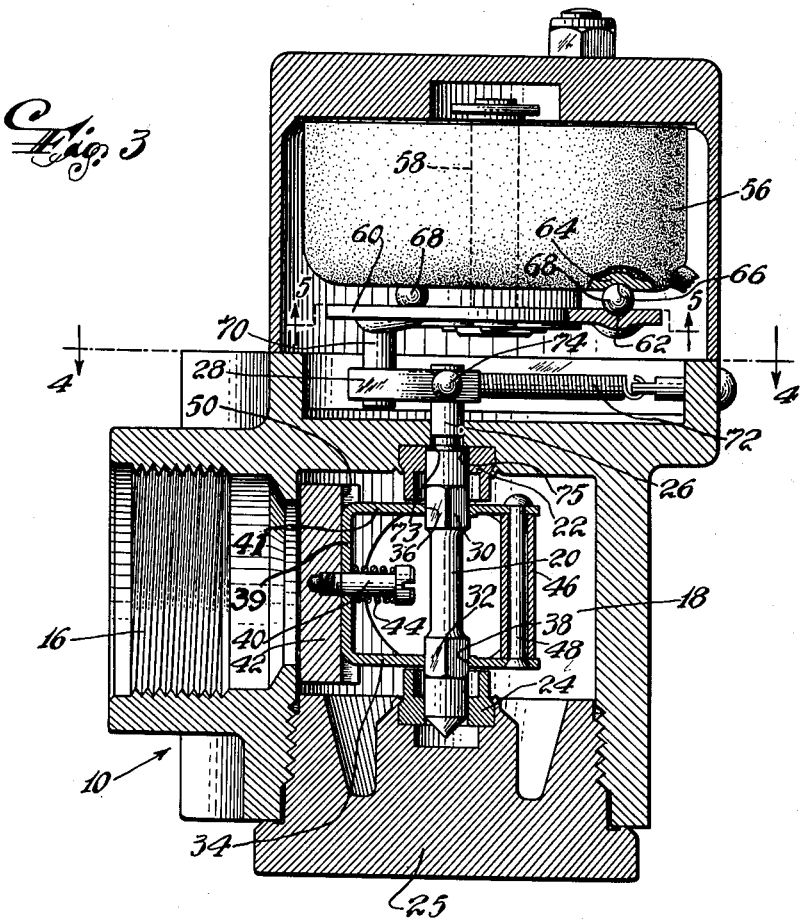
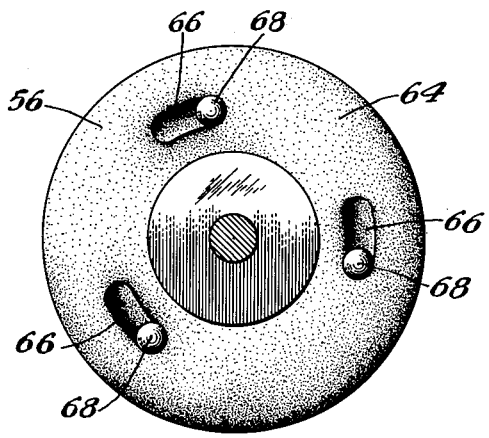
INVENTOR.
HARRY C. GRANT, JR.
BY
J. William Carson
ATTORNEY Sept. 23, 1952 H. C. GRANT, JR 2,611,577
VALVE ASSEMBLY
Filed Dec. 2, 1947 3 Sheets-Sheet 3
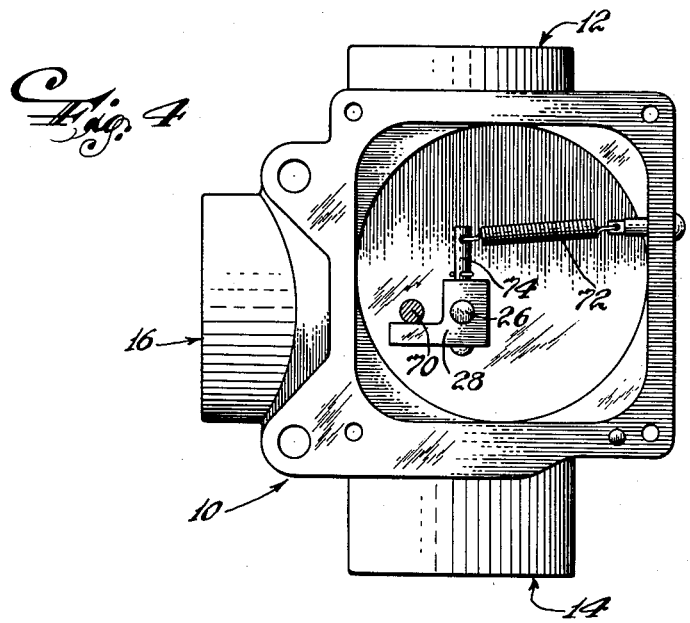
Fig. 4
Fig. 6
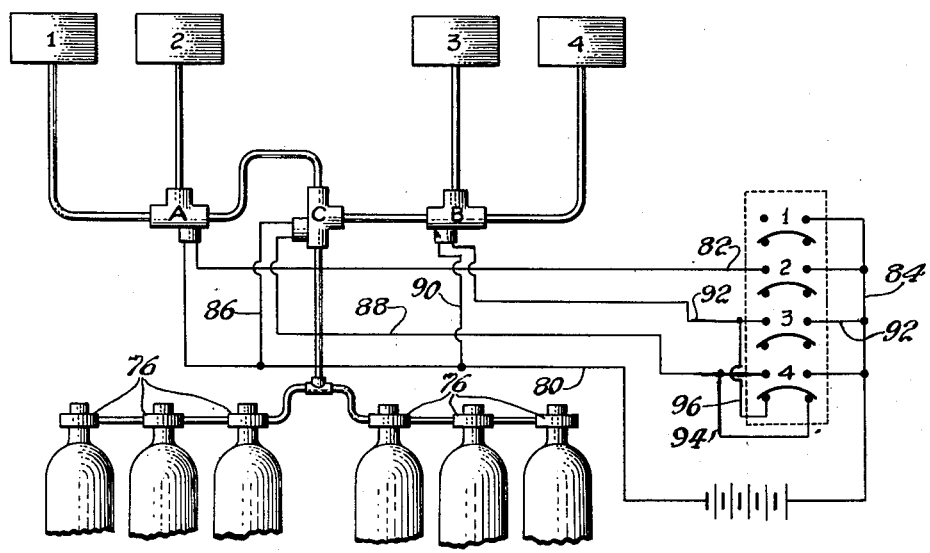
INVENTOR.
HARRY C. GRANT, JR.
BY
J. William Carson
ATTORNEY Patented Sept. 23, 1952

2,611,577

UNITED STATES PATENT OFFICE 2,611,577

VALVE ASSEMBLY

Harry C. Grant, Jr., Ridgewood, N. J., assignor to Specialties Development Corporation, Belleville, N. J., a corporation of New Jersey Application December 2, 1947, Serial No. 789,213

4 Claims. (Cl. 251—102)

This invention relates to improvements in valve assemblies, and is particularly directed to the type of valves generally known as direction valves employed in systems for discharging fluid medium under pressure to selected points of use.

The present invention is particularly adapted to be utilized in connection with fire extinguishing systems for aircraft, which systems comprise a source of fire extinguishing medium under pressure, and a plurality of distribution conduits, controlled by direction valves, for conducting the medium to one or more points of use determined by the valve or valves selected for operation.

Heretofore, in such systems, the direction valves employed have been either of the piston operated or of the electrically operated stop valve type for preventing the discharge of the medium through the discharge or distribution conduits until the selected valve is opened. Valves of the piston operated type require the full pressure of the medium on the piston to effect opening of the valve, and the electrically operated type requires a solenoid or other electrical device to effect opening of the valve. While such valves have been found generally satisfactory in marine and in some industrial installations, they have not been satisfactory for aircraft installations for several reasons, particularly because the operating force necessary to open the valves against the pressure of the medium requires devices of excessive size and weight. In such systems also, wherein the piston operated or electrically operated stop valves are employed, a separate valve is required for each discharge or distribution conduit.

Accordingly, one of the objects of the present invention resides in the provision of a valve assembly, for use in systems of the character indicated, which effectively and efficiently overcomes the disadvantages of prior valve assemblies employed in such systems.

Another object is the provision of a valve assembly wherein the valve operating forces are reduced to a minimum with a resulting reduction in weight of the assembly.

Another object is the provision of a valve assembly so constructed that the number of the valves employed in the system is less than the number of the direction or distribution conduits of the system.

Another object resides in the provision of a two-direction, packless, low torque valve assembly.

A further object is the provision of a valve and readily operable means therefor.

A still further object is the provision of a valve assembly which is of rugged construction; simple and inexpensive to manufacture; and which requires a minimum of maintenance and repair.

Other and further objects of the present invention will be manifest from the following description and the accompanying drawings.

In the drawings, which illustrate a preferred embodiment of the invention:

Fig. 3 is a sectional view taken substantially on line 3—3 of Fig. 1;

Fig. 4 is a view taken on line 4—4 of Fig. 3;

Fig. 5 is a view taken on line 5—5 of Fig. 3; and

Fig. 6 is a schematic view of a system employing three of the valve assemblies of the present invention, together with a wiring diagram of the electrical system for operating the same.

Figure 1:
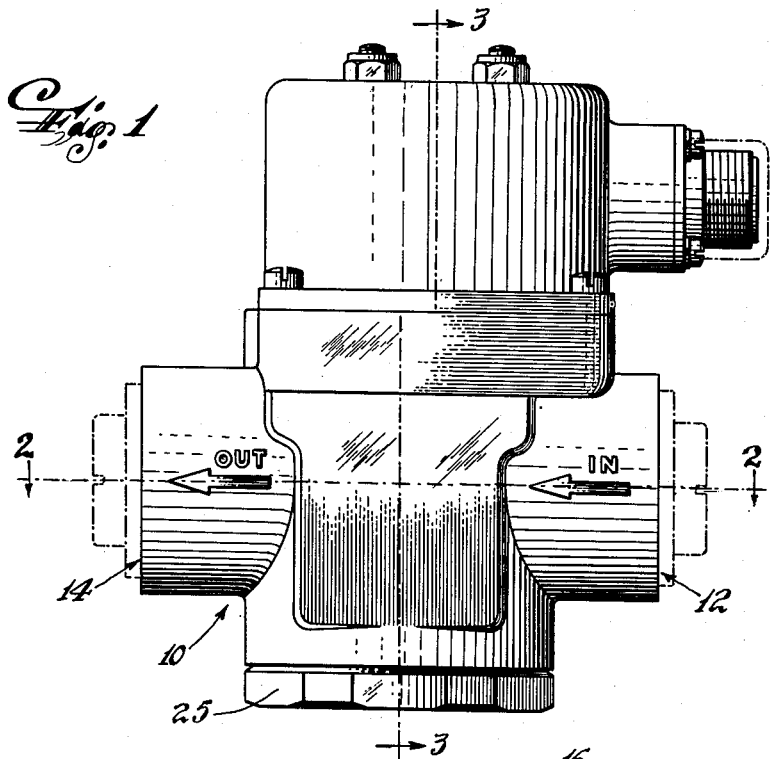
Fig. 1 is an elevational view of the valve assembly of the present invention.

Referring to the drawings in detail, the valve assembly comprises a housing 10 having an inlet 12 and two outlets 14 and 16, respectively, with an intermediate valve chamber 18.

A shaft 20 is disposed substantially centrally of the chamber 18 and has its ends mounted for rotation in bearing caps 22 and 24 (Fig. 3). The cap 22 is secured in a recess in one wall of the housing and the cap 24 is secured in a plug 25 in the opposite wall of the housing 10. The caps are secured in place by peening over the edge of the metal about the caps, or in any other suitable manner. One end of the shaft 20 is pointed, as shown in Fig. 3, whereby to engage the bottom of a recess in the plug 25, and its other end has a projecting portion 26 extending to the outside of the housing 10 where it is provided with a bell crank 28 pinned thereto, the purpose of which will be described presently. The shaft 20 has portions 30 and 32 adjacent to, but spaced from its ends, which portions are square in cross-section.

A rotor 34, substantially U-shaped in cross-section, is supported by the shaft 20, the flanges of the rotor having square openings 36 and 38 adapted to receive the square portions 30 and 32, respectively, of the shaft 20, whereby rotary, or oscillatory, motion will be imparted to the rotor upon rotation or oscillation of the shaft, and whereby the shaft is permitted to slide in the direction of its axis relative to the rotor, in the manner hereinafter described.

The rotor has an aperture in its cross-piece 39 for the reception of a stud 40, which is free to move in the aperture and which is threaded at one end and provided with a head at its other end. The stud is screwed into, or otherwise secured to, a segmental valve member 42 and is provided with a compression spring 44 intermediate its head and the cross-piece 39 of the rotor.

The free ends of the flanges 41 of the U-shaped rotor 34 are held in spaced relation by means of a spacer sleeve 46 enclosing a pin 48, which also serves as a counterbalance for the valve member.

The valve member 42 is adapted to be moved radially away from the rotor under pressure of the medium, in the manner hereinafter described. The valve member has a transverse slot 50 for the reception of the cross-piece 39 of the rotor and in which the rotor is guided in its radial movements while at the same time preventing the rotor from pivoting on the stud 40. The valve member also has two additional parallel transverse recesses or grooves 52 and 54 formed therein on either side of the recess 50, the purpose of which will be described hereinafter.

A rotary solenoid 56 is provided for imparting rotary motion to the shaft 20, which in turn rotates the rotor 34 and the valve member 42. The solenoid, when energized, causes its armature 58 to move inwardly thereof carrying with it a plate 60 which is secured thereto. The plate 60 has a series of arcuate depressions 62 formed therein and the adjacent wall 64 of the solenoid housing has complementary arcuate depressions 66 formed therein for the reception of steel balls 68. The depressions are each deeper at one end than the other, so that when the plate 60 is moved toward the solenoid, by the armature 58, rotary motion is imparted to the plate. The space between the plate 60 and the wall 64 of the solenoid is predetermined, whereby to limit the travel of the plate and consequently limit the rotary motion of the plate to 45°.

The plate 60 has a stud 70 projecting from one face thereof in alignment with one arm of the bell crank 28 which, as previously mentioned, is carried by the shaft 20. The stud 70 is located on the plate 60 in a predetermined eccentric position, whereby when the plate is rotated 45° the bell crank 28, the shaft 20, rotor 34 and the valve member 42 are rotated 90° to move the valve member from the full line position to the dotted line position, as shown in Fig. 2.

Figure 2:
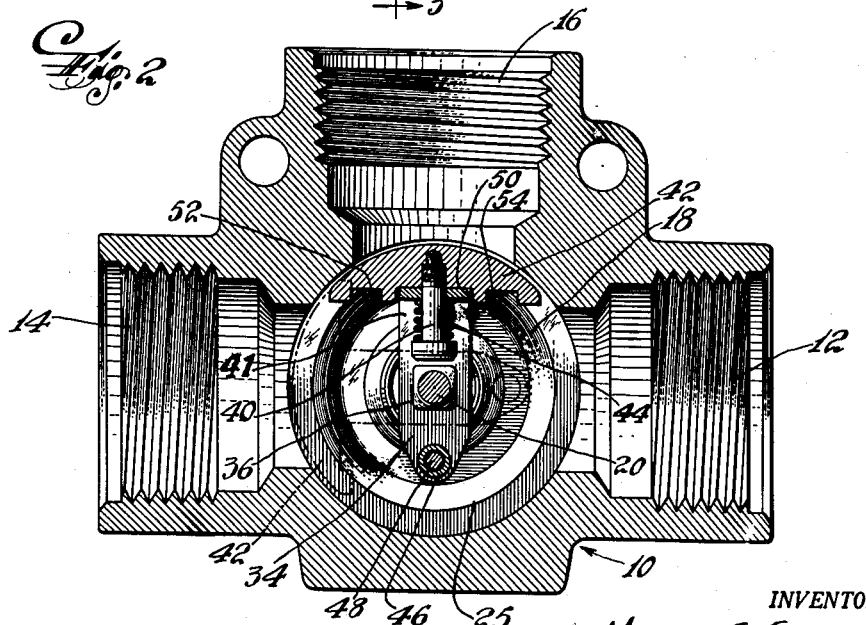
Fig. 2 is a sectional view taken substantially on line 2—2 of Fig. 1.

When in the position, shown in full lines in Fig. 2, the valve member is in position to close off the outlet 16 so that the fluid pressure medium will pass from the inlet 12 through the valve chamber and out of the outlet 14. When the valve member is in the dotted line position, shown in Fig. 2, the fluid medium will pass from the inlet through the valve chamber and out of the outlet 16.

When fluid pressure medium enters the valve chamber, pressure is built up in the chamber because the discharge or distribution lines connected to the inlets have a smaller bore than the outlets, or the lines may be provided with nozzles or the like, which retard or restrict the flow of the medium. The built pressure in the valve chamber will act on the valve member 42 and move the same radially relative to the rotor into close contact with its seat at the outlet. The movement of the valve member is very slight, the radius of the member and the wall of the valve chamber being substantially equal except for a very slight tolerance sufficient to permit the valve member to rotate freely in the chamber. When the valve member is forced on its seat at either outlet by the pressure of the medium, as just described, the side edges of the member have a tendency to flex slightly due to the recesses 52 and 54, whereby a perfect fluid tight seal is provided at the outlet.

The pressure of the fluid medium on the valve member will retain the member in seated position, so that it is not necessary to maintain the solenoid energized for that purpose. In other words, when the circuit to the solenoid is closed and the valve member operated to the selected position, the circuit may thereafter be opened without the valve member returning to its normal position, the latter being held in its selected position as long as the pressure of the fluid medium is retained in the valve chamber.

When the pressure on the valve member is released or reduced due to the discharge of the fluid through the distribution line, the bell crank 28 is returned to its normal position by means of a spring 72, one end of which is attached to a projecting pin 74 (Fig. 4) on the bell crank and the other end to a stud in the housing 10, the spring 72 having been placed under tension when the bell crank was operated through energization of the solenoid. When the bell crank returns to its normal position it in turn rotates the shaft 20, the rotor 34 and the valve member 42 to their respective normal positions ready for a second operation in the event it is desired to again discharge the medium through the same distribution conduit.

In order to effectively form a seal between the shaft 20 and the bearing cap 22 at the solenoid side of the valve housing, the shaft 20 is provided with a frustoconical shoulder 73 adapted to engage a seat 75 formed in the bearing cap 22. By providing the sealing means just described, packing for the bearing is rendered unnecessary, so that the valve assembly of the present invention is packless.

A system in which the valve assembly of the present invention may be employed is schematically illustrated, together with a wiring diagram therefor, in Fig. 6.

In the system illustrated, three of the valve assemblies are employed for the protection of four spaces, which spaces, in a fire extinguishing system for a four engine aircraft, may be the nacelles of the four engines.

In this system, the centrally located valve assembly designated C is common to all of the distribution conduits leading to the engines, but is normally open to the branch lines on the left, as viewed in Fig. 6.

Should a fire break out at the engine designated "1" (Fig. 6), it is merely necessary to open any or all of the main release valves 76, whereupon the fire extinguishing medium will pass through the main conduit to and through the central or common direction valve C and the left hand direction valve designated A, the latter valve being normally open to the branch line leading to engine No. 1.

Should a fire break out at engine No. 2, the switch designated 2 is closed by the operator, whereby to close the circuit to the solenoid of valve assembly A, the current passing from its source through line 80, the solenoid, line 82, switch 2, and line 84 back to its source. The solenoid of valve assembly A when energized will effect rotation of the valve member of that valve assembly to close the outlet to engine No. 1 and open the outlet to engine No. 2, in the manner previously described.

Should a fire break out at engine No. 3 or 4, the solenoid C must be energized to rotate the valve member 90° from its normal position open to the outlet leading to engines Nos. 1 and 2, to close the latter outlet and open the outlet leading to engines Nos. 3 and 4. The valve of the valve assembly B is normally open to the branch line leading to engine No. 4, so that it is only necessary to operate valve C whereby to direct the fire extinguishing medium to that engine. This is accomplished by closing the switch designated 4, whereby current will flow from its source through lines 80 and 86, the solenoid of valve C, line 88, switch No. 4, and line 84 back to its source.

When it is desired to direct the medium to engine No. 3, it is necessary to operate the valve B, in addition to valve C. This is accomplished by closing the switch designated 3, whereby current will flow from its source through lines 80 and 90, the solenoid of valve B, line 92, switch 3 and line 84 back to its source. At the same time, current will flow from its source through lines 80 and 86, the solenoid of valve C, lines 88 and 94, the switch member of the switch designated 4 (which is now in the position shown in Fig. 6), line 96, switch 3 and line 84 back to its source, so that upon closing the switch designated 3 the solenoids of both valves C and B are operated to open the outlets of those valves leading to engine No. 3.

The switches designated 1, 2, 3, and 4 are mounted on a switch panel on the instrument board of the aircraft, and a pull cable, or other means (not shown), is within easy reach of the pilot or operator for operating the release valves 76.

As will be seen from Fig. 6, the switch designated 1 is "dead," in that it is not connected in any circuit. This switch is provided so that the operator, being trained to close a designated switch before opening the release valves, will first press the desired switch button for the direction valve to be operated and then open the release valve. The operator need not know that the switch designated 1 is dead, so that the instructions to the operator, to press the desired switch button before opening the release valve, need not be confused by any exception to those general instructions.

By setting the selected valve in the desired position before opening the release valves, there will be no fluid pressure on the valve member to prevent its operation, or to require any excessive force to open the valve against pressure of the fluid, and accordingly the solenoids employed to operate the valve members may be of lightweight construction.

From the foregoing it will be seen that the present invention provides a two-direction, packless, low torque valve assembly, wherein the valve member is operated before the application of pressure of the fluid medium, and wherein the operating force for the valve member is reduced to a minimum, resulting in a considerable saving of weight as compared with valve actuating mechanism heretofore employed, wherein the operating force necessarily required devices of considerably greater size and weight.

It will also be seen from the foregoing that the use of the valve assembly of the present invention results in a reduction of the number of directional valves employed in a system, compared with the number of conventional directional valves employed in such systems.

While I have illustrated and described a preferred embodiment of my invention, it is to be understood that I do not wish to be limited to that precise construction and arrangement of parts, as obviously various changes and modifications may be made therein without departing from the spirit and scope of my invention.

I claim:

1. A valve assembly for controlling the flow of a fluid pressure medium, comprising a body having a valve chamber formed with an inlet and formed with a wall portion provided with a pair of spaced outlet ports, a valve member in said chamber having a surface facing said wall portion, a rotor in said chamber connected to said valve member for rotating said valve member to position the same to selectively close said outlet ports, and yieldable means for maintaining said valve member surface out of engagement with said chamber wall portion adapted to be rendered ineffective by pressure medium acting on said valve member from within said valve chamber whereby said valve member surface is caused to engage said wall portion.

2. A valve assembly for controlling the flow of a fluid pressure medium, comprising a body having a valve chamber formed with an inlet and formed with a generally cylindrical wall portion provided with a pair of circumferentially spaced outlet ports, a valve member in said chamber having a generally cylindrical surface facing said wall portion, a rotor in said chamber connected to said valve member for rotating said valve member to position the same to selectively close said outlet ports, and yieldable means for maintaining said valve member surface out of engagement with said valve chamber wall portion adapted to be rendered ineffective by pressure medium acting on said valve member from within said valve chamber whereby said valve member surface is caused to engage said wall portion.

3. A valve assembly for controlling the flow of a fluid pressure medium, comprising a body having a valve chamber formed with an inlet and formed with a generally cylindrical wall portion provided with a pair of circumferentially spaced outlet ports, a valve member in said chamber having a generally cylindrical surface facing said wall portion, a rotor in said chamber, and means connecting said valve member for rotation with said rotor to enable said rotor to position said valve member for selectively closing said outlet ports, said connecting means including means for mounting said valve member for movement in a radial direction and a yieldable element arranged for maintaining said valve member surface out of engagement with said valve chamber wall portion and being rendered ineffective by pressure medium acting on said valve member from within said valve chamber whereby said valve member surface is caused to engage said wall portion.

4. A valve assembly according to claim 3, wherein said means for mounting said valve member for movement in a radial direction include a radial aperture in said rotor and a stud extending through said aperture having a head at one end thereof and having its other end secured to said valve member, and wherein said yieldable element is a compression spring mounted on said stud and cooperating with said head and said rotor to urge said valve member radially inwardly to maintain said valve member surface out of engagement with said valve chamber wall portion.

HARRY C. GRANT, Jr.

REFERENCES CITED

The following references are of record in the file of this patent:

UNITED STATES PATENTS

| Number | Name | Date |
|---|---|---|
| 477,720 | Weber | June 28, 1892 |
| 1,053,327 | Stebbins | Feb. 18, 1913 |
| 1,076,802 | White | Oct. 28, 1913 |
| 1,283,818 | Laun | Nov. 5, 1918 |
| 1,448,941 | Powell | Mar. 20, 1923 |
| 1,688,035 | Bryant | Oct. 16, 1928 |
| 1,755,057 | Fagan | Apr. 15, 1930 |
| 1,786,295 | Ericsson | Dec. 23, 1930 |
| 2,422,796 | Monroe | June 24, 1947 |

FOREIGN PATENTS

| Number | Country | Date |
|---|---|---|
| 340,236 | Great Britain | of 1930 |